(12) United States Patent
Dakhil

(10) Patent No.: US 6,349,787 B1
(45) Date of Patent: Feb. 26, 2002

(54) VEHICLE HAVING A TURBINE ENGINE AND A FLYWHEEL POWERED BY LIQUID NITROGEN

(76) Inventor: Farouk Dakhil, Viale R. Belloni 56, 00061 Anguillara S. Rome (IT)

( * ) Notice: Subject to any disclaimer, the term of this patent is extended or adjusted under 35 U.S.C. 154(b) by 0 days.

(21) Appl. No.: 09/566,833

(22) Filed: May 8, 2000

(51) Int. Cl.[7] .................................................. B60K 3/00
(52) U.S. Cl. ...................................... 180/302; 180/305
(58) Field of Search ............................... 180/54.1, 302, 180/303, 305, 165, 309, 310; 60/651, 668, 671

(56) References Cited

U.S. PATENT DOCUMENTS

| | | | |
|---|---|---|---|
| 3,232,050 A | | 2/1966 | Robinson et al. |
| 3,589,126 A | | 6/1971 | Zotto |
| 3,771,311 A | * | 11/1973 | Herbst ........................ 60/651 X |
| 3,830,326 A | | 8/1974 | Hartung |
| 3,841,173 A | * | 10/1974 | Kraus |
| 3,842,333 A | | 10/1974 | Boese et al. |
| 3,898,794 A | * | 8/1975 | Ariga ........................... 60/668 |
| 3,987,632 A | * | 10/1976 | Pereda |
| 4,043,126 A | * | 8/1977 | Santos ........................... 60/651 |
| 4,075,542 A | * | 2/1978 | Szegedy |
| 4,106,581 A | | 8/1978 | West et al. |
| 4,163,367 A | * | 8/1979 | Yeh ......................... 180/302 X |
| 4,294,323 A | | 10/1981 | Boese |
| 4,311,917 A | * | 1/1982 | Hencey, Jr. et al. ..... 180/302 X |
| 4,327,553 A | | 5/1982 | Rilett |
| 4,449,372 A | | 5/1984 | Rilett |
| 5,182,913 A | | 2/1993 | Robar et al. |

OTHER PUBLICATIONS

Rosen et al. "The Flywheel and How It Works," *Scientific American*, Oct. 1997, pp. 50–51.

* cited by examiner

*Primary Examiner*—Anne Marie Boehler
*Assistant Examiner*—Bryan Fischmann

(57) ABSTRACT

A vehicle with drive apparatus having a liquid nitrogen driven engine for primary power coupled with a liquid nitrogen driven fly wheel for acceleration and power consumption. The drive apparatus includes a fuel tank for containing liquid nitrogen. A heating device converts the liquid nitrogen to nitrogen gas to be held in a plenum tank. There is mechanism for directing the nitrogen gas from the plenum tank to the turbine engine, the fly wheel and/or the alternator. The alternator is turbine driven and charges a battery which powers control mechanism for the drive apparatus.

2 Claims, 4 Drawing Sheets

VEHICLE HAVING A TURBINE ENGINE AND A FLYWHEEL POWERED BY LIQUID NITROGEN

FIELD OF THE INVENTION

The present invention relates generally to a vehicle with drive apparatus and, more particularly, to drive apparatus having a liquid nitrogen driven turbine engine for primary power coupled with a liquid nitrogen driven flywheel for acceleration and power conservation.

BACKGROUND OF THE INVENTION

With the onset of global climatic warming, there is increased awareness and political pressure to reduce ever increasing pollution (poisonous carbon dioxide, carbon monoxide and other gases which get released into the open atmosphere). The main source of air pollution, next to heavy industry, are cars and gasoline driven vehicles. This gaseous pollution is endangering life on the whole planet.

In the early 1990's there was formed in the United States a partnership for a new generation of vehicles in which many car companies and many more smaller technical firms became involved. One of the most promising achievements as a result of this was the so-called hybrid electric vehicle, which combined an electrical motor and a highly efficient internal combustion engine. Another result of that effort was the electrical car. Both the hybrid electrical vehicle and the electric car, however, have not moved out of the development stage. Both types of vehicles are prohibitively expensive in the marketplace and both are heavy (due to batteries), which tends to make them ultimately less efficient and less desirable. Outside the United States, particularly in Europe and Japan where the price of gasoline is several times the price in the United States, even fewer of this projected new generation of vehicles have reached the marketplace. Thus, even though there is the ever-increasing danger posed by air pollution to the earth, vehicles intended to reduce air pollution are not becoming a solution for the problem.

The perfect goal is to reduce air pollution from vehicles to zero emission and at the same time to help cool down the global warming and even clean up the atmosphere from carbon dioxide and other poisonous gasses. Indeed, all this could be achieved by a vehicle driven by liquid nitrogen gas as in the present invention.

Nitrogen gas makes up 78.084% of atmospheric air volume. Thus, nitrogen is essentially an infinite source. Liquid nitrogen is relatively inexpensive to produce in large quantities. Thus, liquid nitrogen is essentially an infinite renewable source of energy, environmentally friendly, and if emitted to the open air, will not pollute the air and possibly could help in compensating against global warming. There is significant motivation for the world to accept vehicles driven by liquid nitrogen. The problem with gaseous driven turbine vehicles to date has been performance. That is, they have not been capable of acceleration to the same degree as an internal combustion driven vehicle. The present invention addresses this problem.

SUMMARY OF THE INVENTION

The present invention provides for a vehicle to be driven not only by a turbine engine, but also by a fly wheel, both powered by a system fueled with liquid nitrogen. Furthermore, an alternator is also driven by the liquid nitrogen to provide power through a battery for controlling the drive apparatus.

More particularly, the vehicle of the present invention has wheels driven by a drive apparatus. The vehicle includes a fuel tank for containing liquid nitrogen. A heater receives the liquid nitrogen from the fuel tank and converts the liquid nitrogen to nitrogen gas. A plenum tank receives the nitrogen gas from the heater. The vehicle also includes a turbine engine and a mechanism for driving the turbine engine with the nitrogen gas from the plenum tank. The vehicle further includes a fly wheel and mechanism for driving the fly wheel with the nitrogen gas from the plenum tank. The vehicle also has a battery and an alternator for converting mechanical energy to electrical energy to charge the battery. There is mechanism for driving the alternator with the nitrogen gas from either the plenum tank or the output gas from the turbine engine or from both. There is also mechanism for controlling the turbine engine driving mechanism, the fly wheel driving mechanism, and the alternator driving mechanism. The controlling mechanism is powered by the battery.

The fly wheel for the vehicle of the present invention ha a shaft for driving the wheels of the vehicle so that the energy stored can be used for acceleration or receiving energy when braking. The fly wheel has a rotor on the shaft and a turbine wheel for receiving the nitrogen gas from the fly wheel driving the mechanism to thereby rotate so as to drive the shaft and the rotor.

DETAILED DESCRIPTION OF THE PREFERRED EMBODIMENT

Figure 1:
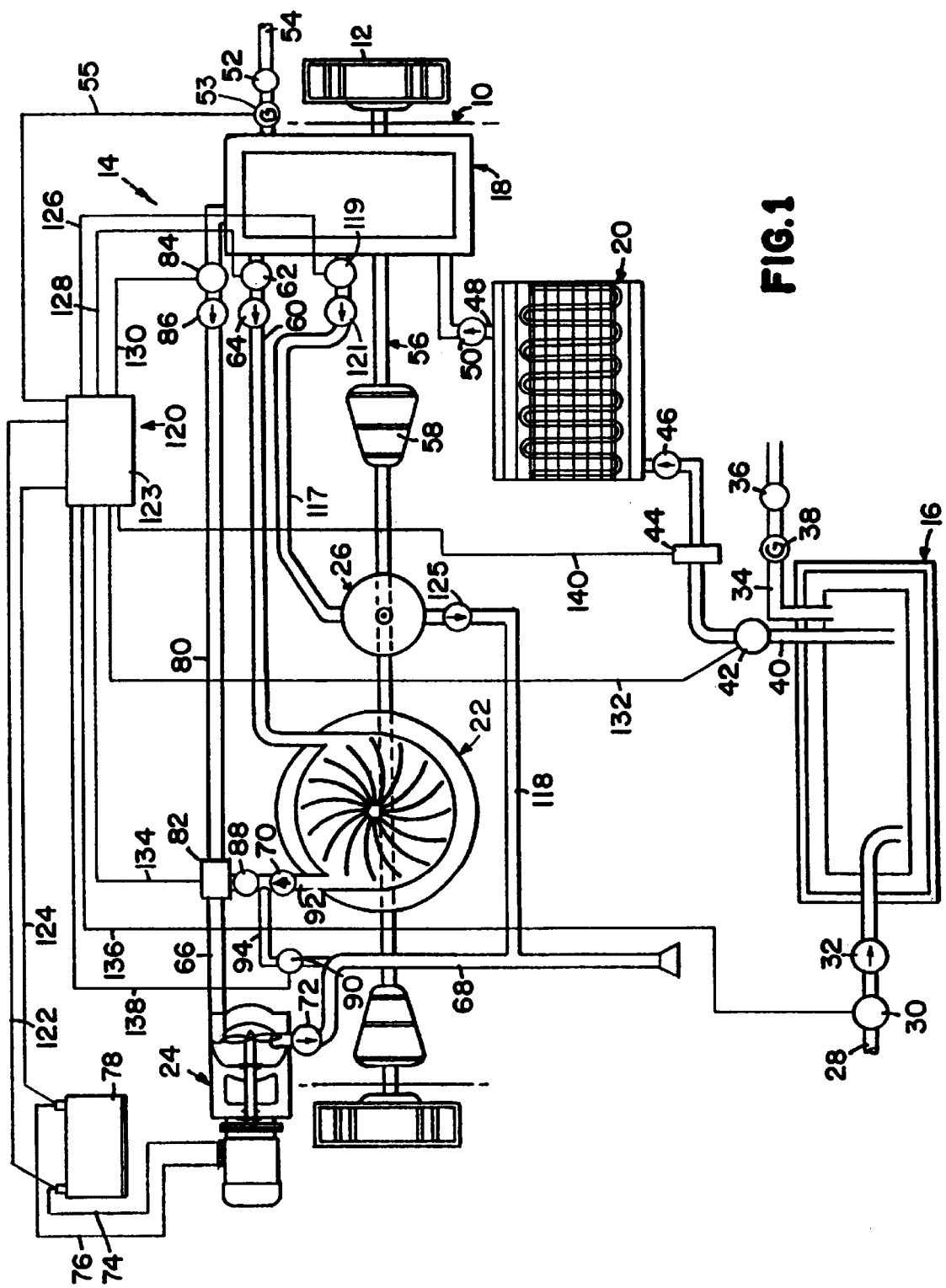
FIG. 1 is an illustration which depicts schematically the present invention.

With reference to the drawings wherein like parts are designated by the same numerals throughout, a vehicle in accordance with the present invention is designated generally by the numeral 10. With reference to FIG. 1, vehicle 10 is illustrated with wheels 12 and drive apparatus 14. The installation of apparatus 14 in vehicle 10 is described in sufficient detail so that one skilled in the art would otherwise arrange, attach, and operably install apparatus 14 with respect to all necessary other systems and assemblies of the vehicle.

Apparatus 14 includes a fuel tank 16, a plenum tank 18, a heating device 20, a turbine engine 22, an alternator 24, and a flywheel 26.

Liquid nitrogen is the intended fuel. Liquid nitrogen is filled into fuel tank 16 through pipe 28. Solenoid valve 30 is opened to allow fuel to be pumped through check valve 32 into fuel tank 16. When tank 16 is sufficiently filled, solenoid valve 30 is closed.

Fuel tank 16 is an insulated pressure tank, such as a dewar flask, constructed to safely receive liquid nitrogen. Liquid nitrogen has a boiling point of minus 320° F. and a vapor pressure of 150 psig.

Pipe 34 is provided to allow the release of gases and pressure in fuel tank 16 during liquid filling, including the release of moisture. Relief valve 36 and pressure gauge 38 control and provide information regarding appropriate release.

Pipe 40 provides fluid communication of liquid nitrogen from fuel tank 16 to heating device 20 through solenoid valve 42, pump 44 and check valve 46. When fuel is called for as described further below, pump 44 turns on and solenoid valve 42 opens. When fuel is no longer needed to energize the system, pump 44 turns off and solenoid valve 42 closes. Check valve 32, solenoid valve 42 and relief valve 36 control the liquid nitrogen flow and pressure relative to fuel tank 16.

Check valve 46 is a one way valve providing flow toward heating device 20 and preventing flow back from heating device 20 to pump 44. Pump 44 is conventional for pumping liquid nitrogen and has sufficient capacity for the fuel needs of apparatus 14.

Heating device 20 may be a heating unit electrically powered (not shown) or may be a radiator for receiving atmospheric heat. Heating device 20 nonetheless, has sufficient capability to provide heat to gasify nitrogen at a capacity level sufficient to provide the expected design performance for apparatus 14.

Heating device 20 is in fluid communication with plenum tank 18 via pipe 48 through one way check valve 50.

Plenum tank 18 is a pressurized tank for holding gaseous nitrogen resulting from the gasification of the liquid nitrogen fuel at heating device 20. Plenum tank 18 is also, for example, a dewar flask, or other pressurized vessel known to those skilled in the art, which has an adequate safety rating for the volume and pressure needed to provide the power capacity for apparatus 14, and is adequately insulated.

Relief valve 52 in fluid communication through pipe 54 with plenum tank 18 prevents pressure from exceeding a safe value. Sensor gauge 53 is monitored via line 55 by control device 123 and when the pressure drops below a predetermined minimum as established by the performance desired for the vehicle, solenoid valve 42 is opened, pump 44 is turned on, and heater 20 if necessary is also controlled as desired so that additional nitrogen gas is charged into plenum tank 18.

Wheels 12 which may be the front wheels or the back wheels for vehicle 10 are connected via a shaft 56 through one or more transmission units 58 to power devices, namely, turbine engine 22 and flywheel 26. There are differential joints and other conventional structures as known to those skilled in the art for operable installation relative to vehicle 10. FIG. 1 is illustrative only and does not show for the sake of clarity all structures which may be installed and are known to those skilled in the art. Likewise, turbine engine 22 and flywheel 26 are shown only schematically connected with transmission 58 and shaft 56.

Turbine engine 22 is conventional and receives pressurized nitrogen as a driving fluid from plenum tank 18 via pipe 60 through solenoid valve 62 and one way check valve 64. Turbine engine 22 is conventional. Outlet pipe 92 provides fluid communication for spent nitrogen gas from turbine engine 22 through tee 82 and pipe 66 to alternator 24. Alternator 24 is also conventional and includes a turbine-like structure which is driven by either the remaining pressure in the gaseous nitrogen from turbine engine 22 or nitrogen gas from plenum tank 18. Alternator 24 is electrically wired via lines 74 and 76 to a battery 78 in a conventional fashion.

Pipe 80 directly provides fluid communication from plenum tank 18 to alternator 22 by connecting with pipe 66 at tee 82. If there is not adequate energy remaining in the output nitrogen gas from turbine engine 22 to drive alternator 24 as needed, then nitrogen gas directly from plenum chamber 18 can flow through pipes 80 and 66 via solenoid valve 84 and check valve 86. Solenoid valve 84 is opened when gas is called for and closed when gas from plenum chamber 18 is no longer required. Solenoid valve 88 is closed whenever solenoid valve 84 is open. Check valve 86 prevents outlet gas from turbine engine 24 from flowing back toward plenum tank 18.

If there is still adequate energy remaining in the output nitrogen gas from turbine engine 22 in order to drive alternator 24 as needed, then solenoid valves 84 and 90 are kept closed and solenoid valve 88 is opened. This allows the output nitrogen gas from turbine engine 22 to flow through pipes 92 and 66 to alternator 24. When solenoid valve 88 is closed, then solenoid valve 90 must be opened so that output nitrogen gas from turbine engine 22 can flow through check valve 70 and pipes 92 and 94 to exhaust pipe 68. Output nitrogen gas from alternator 24 flows through check valve 72 to exhaust pipe 68. The peak power of turbine engine 22 is reduced by the present invention relative to a turbine only vehicle in that all impulsive power is supplied by flywheel 26. Flywheel 26 takes care of initial acceleration and climbing of hill power needs.

Figure 2:
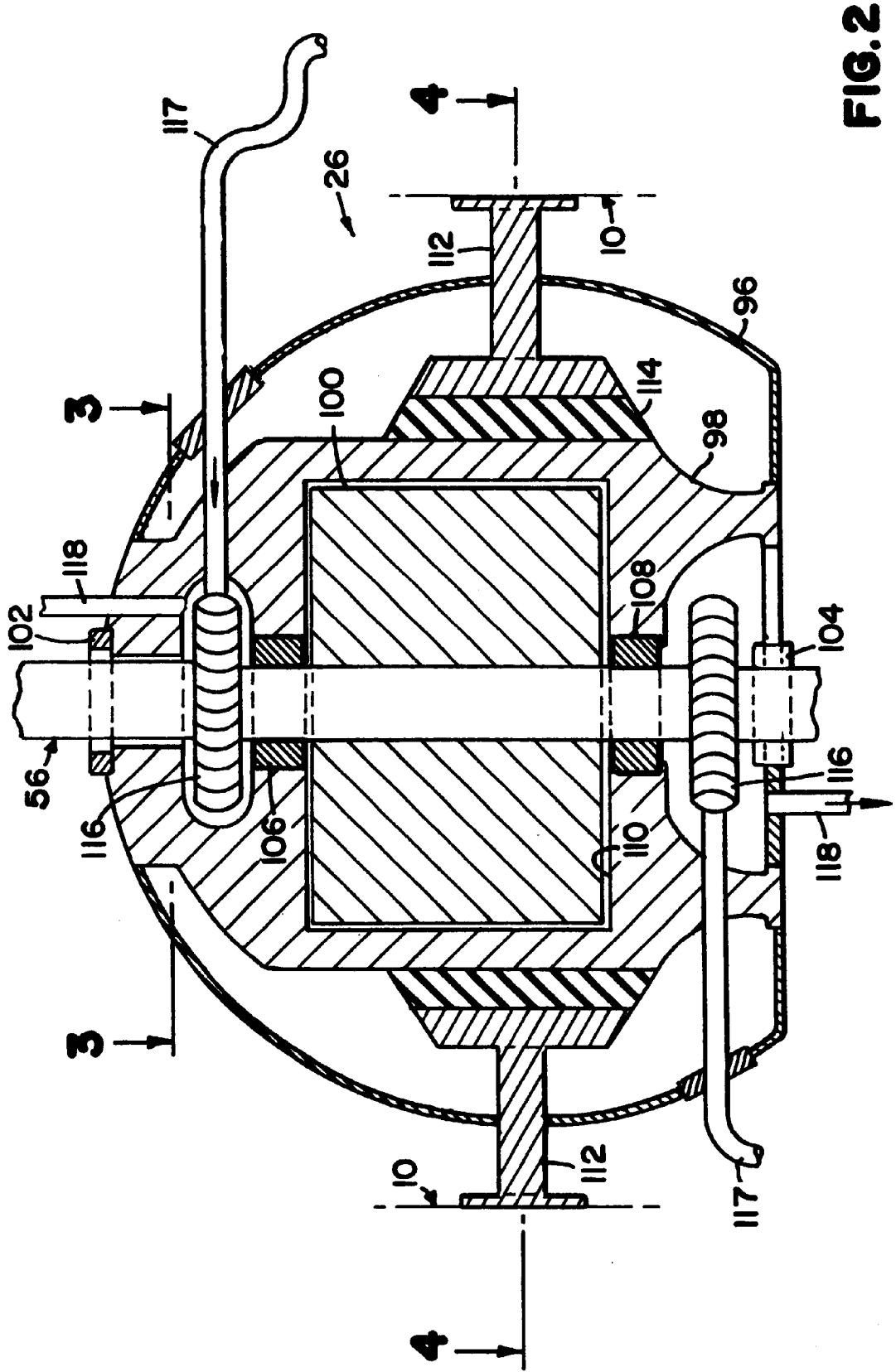
FIG. 2 is a cross-sectional view of a fly wheel in accordance with the present invention.
Figure 3:
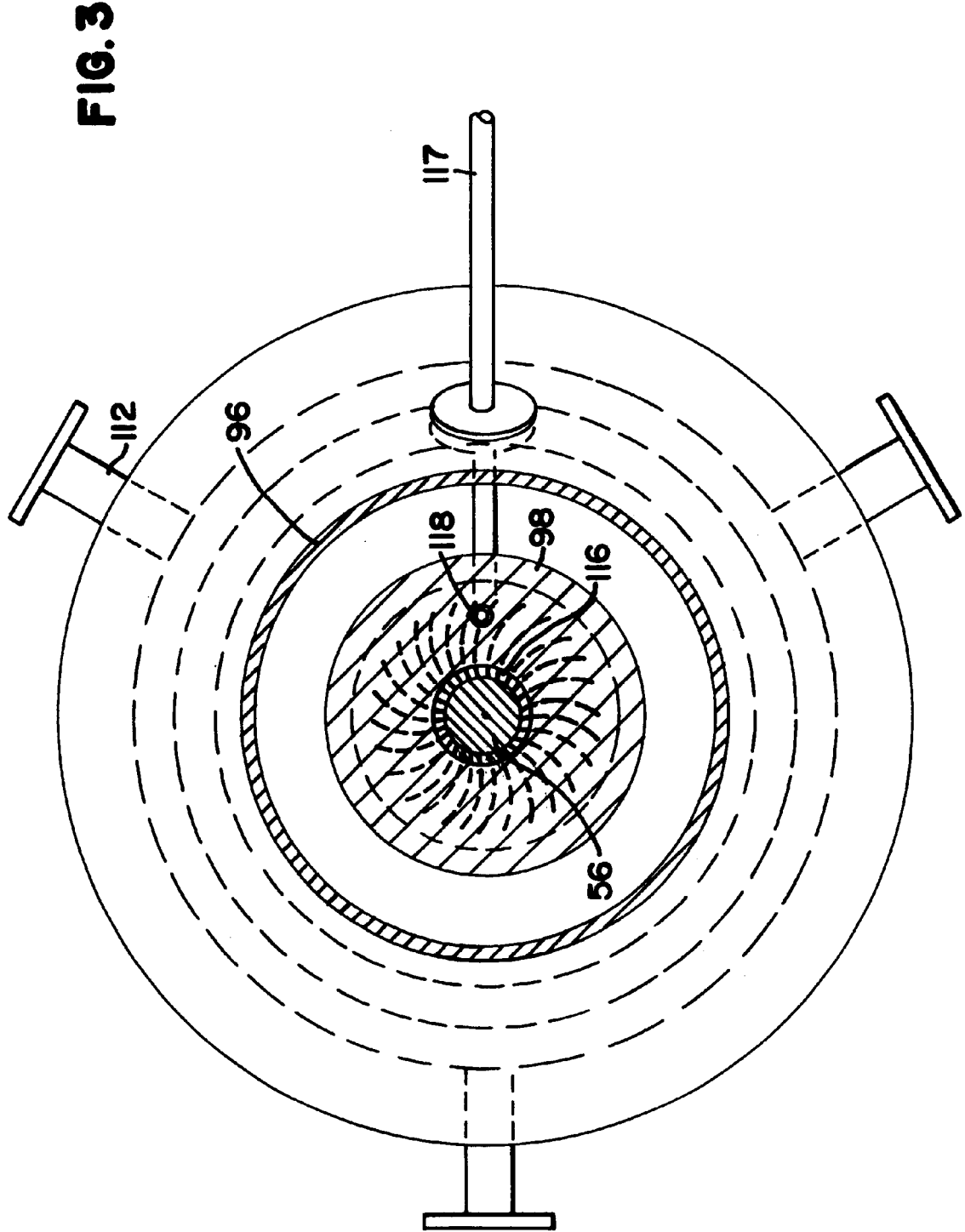
FIG. 3 is a cross-sectional view taken along line 3—3 of FIG. 2.
Figure 4:
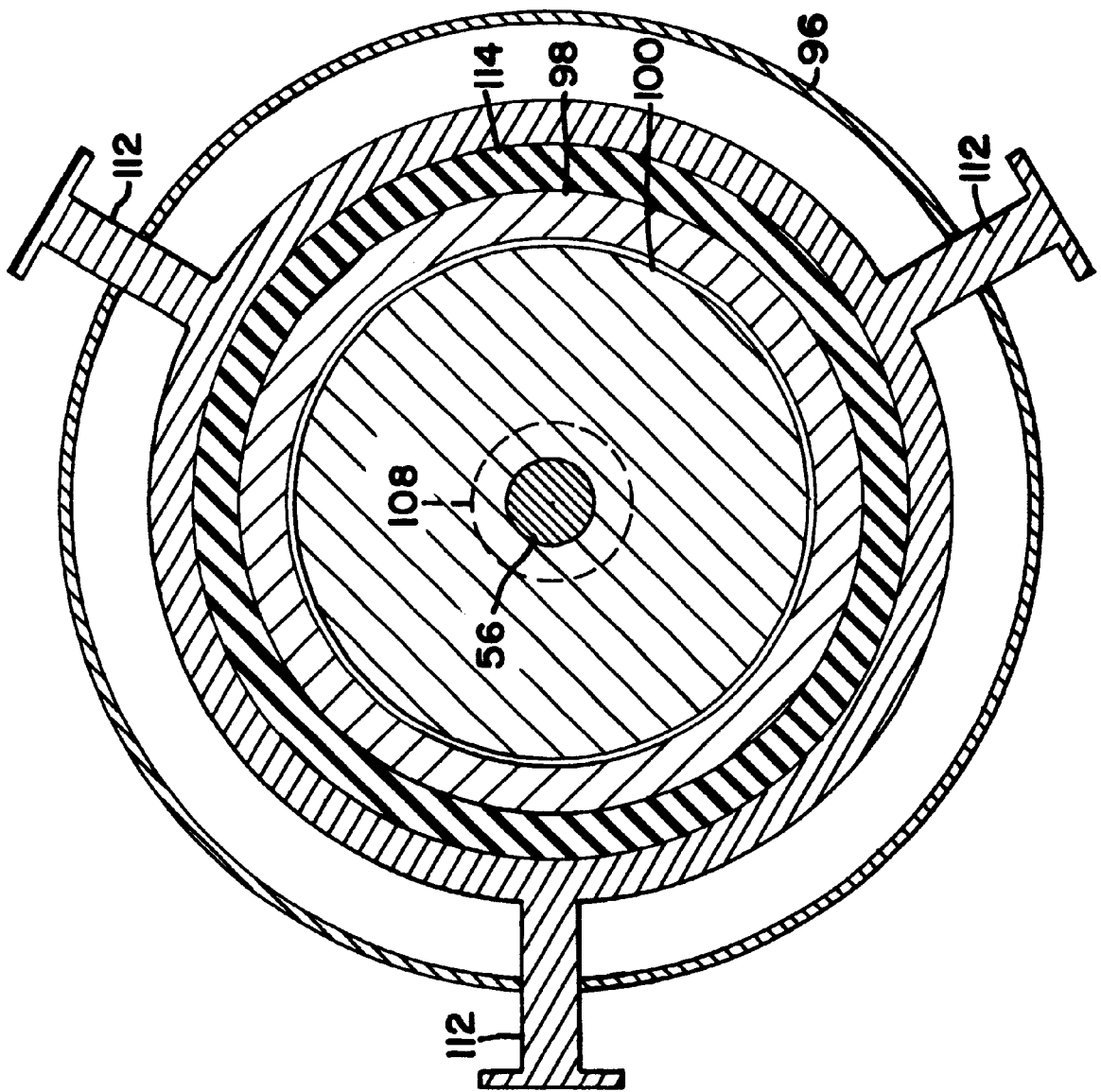
FIG. 4 is a cross-sectional view taken along line 4—4 of FIG. 2.

With reference to FIGS. 2–4, fly wheel 26 includes a containment vessel 96. Frame 98 contains rotor 100. Frame 98 is fastened to containment vessel 96 in at least locations at opposite ends of containment vessel 96 near regions where shaft 56 passes through containment vessel 96. The main purpose of frame 98 is to contain rotor 100 and provide attachment with respect to containment vessel 96. Otherwise, the shape of frame 98 is not important. The containment vessel is preferably made of a fiber composite to ensure against any accidental breakage of parts, such as the rotor, and to contain any parts from scattering during a vehicle crash.

Shaft 56 passes through frame 98 and containment vessel 96 at bosses 102 and 104. Bearings 106 and 108 support shaft 56 relative to frame 98. Rotor 100 is fixed on shaft 56 and contained within a cavity 110 of frame 98. Bearings 106 and 108 are fitted to frame 98 on opposite ends of rotor 100.

Fly wheel 26 is fastened to vehicle 10 at attachment pedestals 112 (see FIG. 4). A rubber or otherwise somewhat flexible intermediate layer 114 is fastened between frame 98 and pedestals 112 to provide isolation between the frame and rotor and the rest of vehicle 10.

Turbine wheels 116 are fastened to shaft 56 at opposite sides of rotor 100 between the bearings and the containment vessel. Turbine wheels 116 provide rotational motion to rotor 100 when nitrogen gas is directed to flywheel 26 from plenum tank 18, solenoid valve 119 and check valve 121 via pipe 117 (see FIG. 1). Output nitrogen gas exhausts at pipe 118 through check valve 125 to exhaust pipe 68 (see FIG. 1). Any heat created by aerodynamic drag in flywheel 26 is advantageous in that it helps to heat the exhausted nitrogen and adjust it to outside ambient temperature.

Fly wheel 26 has been briefly described, but except for the drive mechanism of turbine wheels 116 and associated plumbing, fly wheel 26 is conventional and can have many other designs than that described.

A control system 120 is schematically illustrated with respect to drive assembly 14 in FIG. 1. Control system 120 has a control device 123 powered by connections ultimately made with battery 78 as illustrated by wires 122 and 124. Control system 120 through control device 123 controls the various solenoid valves 119, 62, 84,42, 88, 30, and 90 as illustrated by lines 126, 128, 130, 132, 134, 136, and 138 respectively. Also, control system 120 controls pump 44 as illustrated by line 140 and obtains information from pressure sensor 53 via line 55. The flywheel and control system can also be modified to recover energy during braking.

The turbine engine 22, flywheel 26, alternator 24, and heater 20 are preferably made of a substance having low weight and a low thermal expansion coefficient, such as TEFLON. The low weight boosts overall vehicle efficiency, and the low thermal expansion material helps resist the effects of the low temperature nitrogen. Both low temperature operation and lighter weight boost efficiency in that less fuel is needed. This is particularly advantageous relative to hybrid vehicles (heavy batteries or fuel cells).

In use, fuel tank 16 is filled by opening solenoid valve 30 with control system 120 and directing liquid nitrogen through pipe 28.

Plenum tank 18 holds nitrogen gas at a designated pressure controlled by control system 120 with information from pressure sensor 53. When the pressure decreases sufficiently control system 120 turns on pump 44 and opens solenoid valve 42 so that liquid nitrogen is pumped from fuel tank 16 through heating device 20 so that the liquid is gasified so that the nitrogen gas in plenum tank 18 is increased.

Fly wheel 26 will commonly spin and thus retain energy for many days, even weeks. Thus, when the vehicle is to start-up or when acceleration is required, control system 120 will open solenoid valve 119, if necessary, to increase the energy available in the spinning rotor 100 by directing nitrogen gas against turbine wheels 116. If is already sufficient energy in flywheel 26, the transmission 58 will be appropriately engaged via a clutch and other conventional controlling devices to cause wheels 12 to rotate as desired (non nitrogen drive apparatus not shown).

For normal cruising, control system 120 will open solenoid valve 62 so that nitrogen gas is directed from plenum tank 18 to turbine engine 22 which then also drives wheels 12 through transmission 58 via conventional clutch and controlling devices. The output nitrogen gas from turbine engine 22 normally is directed to alternator 24 before exhausting. If there is not sufficient energy remaining in the output nitrogen gas from turbine engine 22, then solenoid valve 88 is closed and solenoid valves 84 and 90 are opened so that output nitrogen gas from turbine engine 24 is exhausted and nitrogen gas from plenum tank 18 is directed to alternator 24 to drive it before the gas is exhausted.

Control system 120 not only controls drive apparatus 14, but is powered by battery 78 which is recharged by alternator 24, a component of drive assembly 14.

Vehicle 10 as disclosed is illustrative of the present invention. Alterations of various components and assemblies are likely. Thus, the invention is limited only by the scope of the appended claims and equivalents.

What is claimed is:

1. A vehicle with wheels driven by drive apparatus, comprising:

a fuel tank for containing liquid nitrogen;

a beating device for receiving the liquid nitrogen from the fuel tank and converting the liquid nitrogen to nitrogen gas;

a plenum tank for receiving the nitrogen gas from the heating device;

a turbine engine;

means for driving the turbine engine with the nitrogen gas from the plenum tank, said turbine engine for operably driving said wheels;

a fly wheel;

means for driving the fly wheel with the nitrogen gas from the plenum tank;

a battery;

an alternator for converting mechanical energy to electrical energy to charge the battery;

means for driving the alternator with the nitrogen gas from one of the plenum tank and output gas from the turbine engine; and means for controlling said turbine engine driving means, said fly wheel driving means, and said alternator driving means, said controlling means being powered by said battery.

2. The vehicle of claim 1 wherein said fly wheel includes a shaft for operably driving said wheels, a rotor on said shaft, and a turbine wheel for receiving the nitrogen gas from said fly wheel driving means and thereby rotating so as to drive said shaft and rotor.

\* \* \* \* \*